Patented Oct. 16, 1923.

1,471,275

UNITED STATES PATENT OFFICE.

ELIE J. MONEUSE, OF PALISADE, NEW JERSEY.

TOASTER.

Application filed August 9, 1922. Serial No. 580,743.

*To all whom it may concern:*

Be it known that I, ELIE JEROME MONEUSE, a citizen of the United States, and a resident of Palisade, in the county of Bergen and State of New Jersey, have invented new and useful Improvements in Toasters, of which the following is a full, clear, and exact description.

This invention relates to toasters primarily designed for use in places where it is necessary to toast large quantities of bread.

The general object of this invention is the provision of a cheap, simple and efficient toaster adapted for toasting large quantities of bread at a time.

A further object of the invention is the provision of a toaster provided with means for feeding a desired number of pieces of bread onto the toasting drum and provided with means for delivering the toasted bread quickly after it has been toasted.

Another object is the provision of a toaster provided with means for toasting both sides of a piece of bread at the same time.

These and other objects are accomplished by providing a casing in which a drum having bread holding shelves attached thereto is rotatably mounted on a hollow shaft, means being provided for revolving the drum, for feeding the bread onto the bread holding shelves attached to the drum, and for toasting both sides of the bread as it passes around the drum.

These and other objects of the invention will be more clearly understood from the following detailed description and accompanying drawings.

Figure 1:
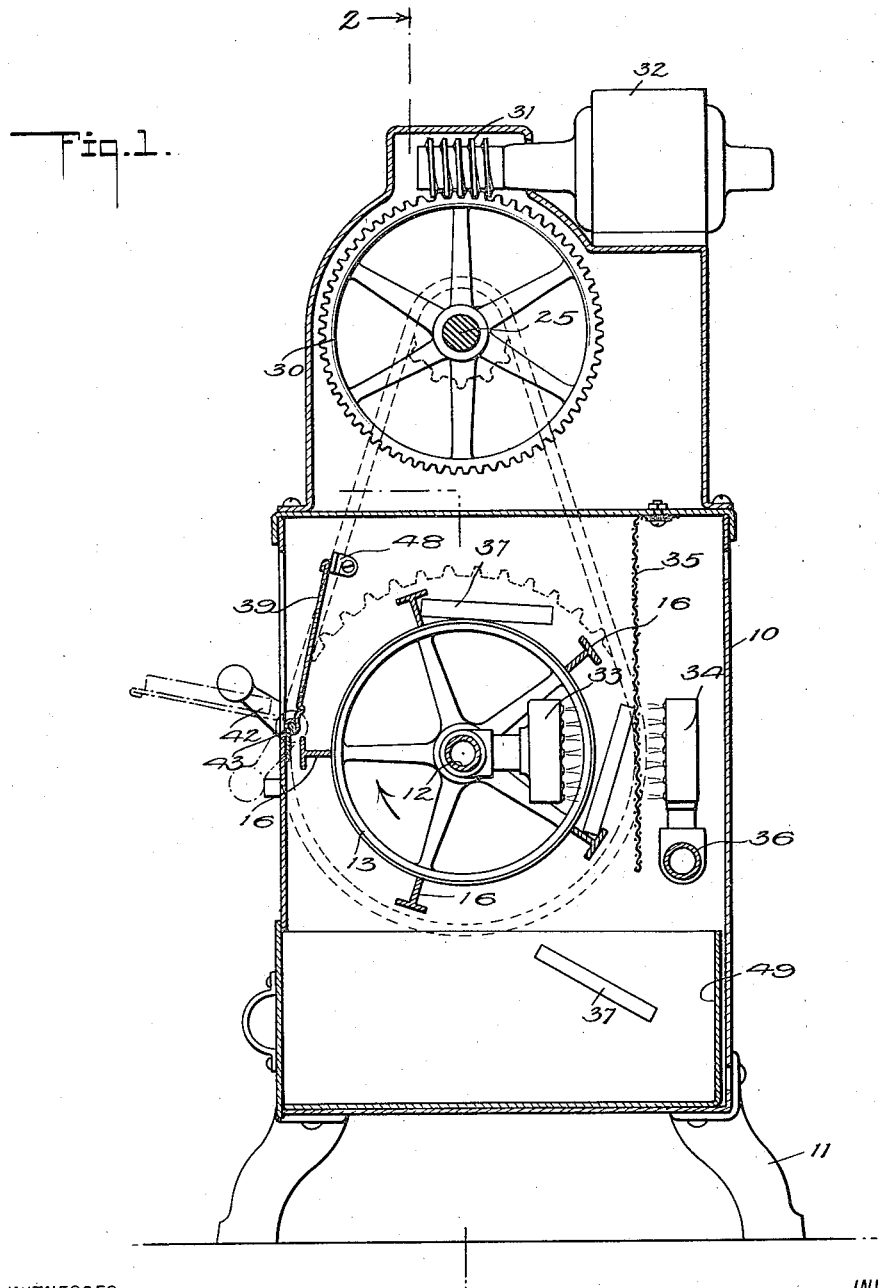
Figure 1 is a section along the line 1—1 Figure 2.
Figure 2:
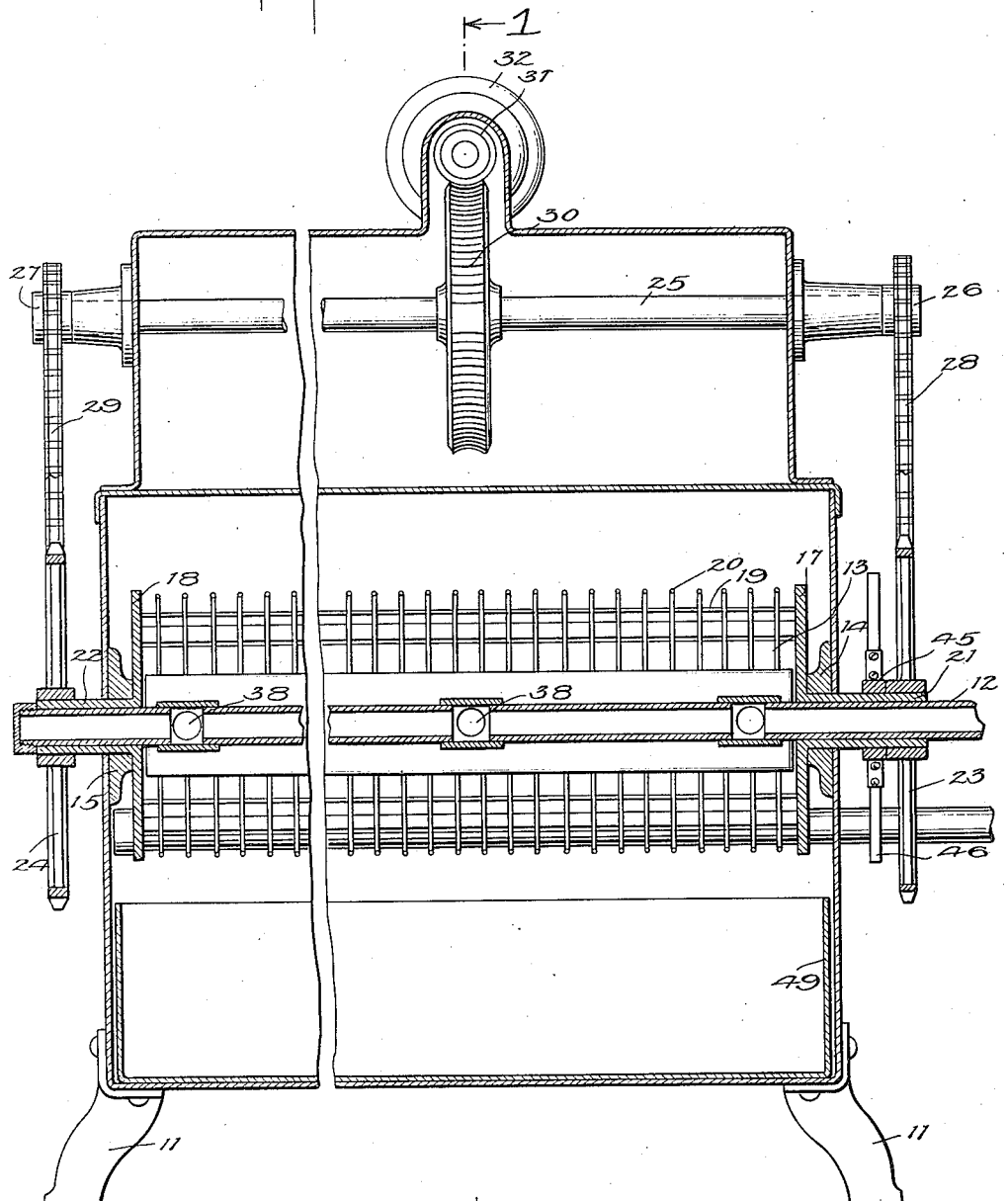
Figure 2 is a section along the line 2—2, Figure 1.

Referring to the above-mentioned drawings, the toaster includes a casing 10 supported on legs 11. A hollow shaft 12 extends through the casing and a drum 13 is rotatably mounted on the hollow shaft and retained in position in the casing by means of collars 14 and 15. The drum 13 includes two disks 17 and 18 having integral therewith bearings 21 and 22, respectively. Mounted on the disks 17 and 18 and spaced from one another about the circumference of the disks are a plurality of rods 19, thus forming a cylindrical cage. In order to strengthen this construction a number of rings 20 are positioned inside of the cylindrical cage and attached to the rods 19. Bread receiving shelves 16, which are T-shaped and attached to the cylinder 13, extend parallel to the axis of the cylinder and are circumferentially spaced from one another. Attached to the bearings 21 and 22 of the drum 13 are sprocket wheels 23 and 24.

In the upper section of the casing a shaft 25 is rotatably mounted and extends through the walls of the casing. Attached to each end of this shaft 25 are sprocket wheels 26 and 27. The sprocket wheels 26 and 27 are connected to the sprocket wheels 23 and 24, respectively, by means of chains 28 and 29. Positioned on the center of the shaft 25 and fixed thereto is a worm gear 30 which meshes with a worm 31 attached to the shaft of a motor 32.

Burners 33 and 34 are provided for directing flames toward the toast for the purpose of toasting. The burner 33 is mounted inside of the drum 13 and is supported by the hollow shaft 12. The fuel for the burner 33 is supplied through the hollow shaft 12 and openings 38 in the hollow shaft. The burner 34 is mounted outside of the drum but inside of the casing 10 and is positioned in alinement with the burner 33 located in the drum 13. This burner 34 is supplied with fuel through a pipe 36. The burner 33 directs the flames outward through the drum wall while the burner 34 directs the flames inward toward the drum. In order to prevent the flames from impinging on the pieces of bread 37 directly, a screen 35 depends from the top of the casing 10 in front of the burner 34.

As set forth in the preceding paragraph, gas burners 33 and 34 are provided for toasting bread. However, instead of gas burners electric heaters might be provided. In some cases, other heating units might be used according to the requirements of the user. After a toaster provided with heating elements has been in operation for some time the temperature in the casing 10 increases and as soon as the bread enters the casing the cooking process begins.

A rack 39 provided with trunnions 40 is pivotally mounted in the casing 10 extending parallel to the axis of the drum 13. Fixed to the trunnions 40 are two arms 42 and 44 which are not in line with the rack 39 but are turned counter-clockwise about the trunnions through a certain desired angle. The weighted arm 42 is provided with a projection 43 which extends outward and parallel with the axis of the drum 13. Extending the length of the rack 39 is an opening 41 in the casing 10.

Figure 3:
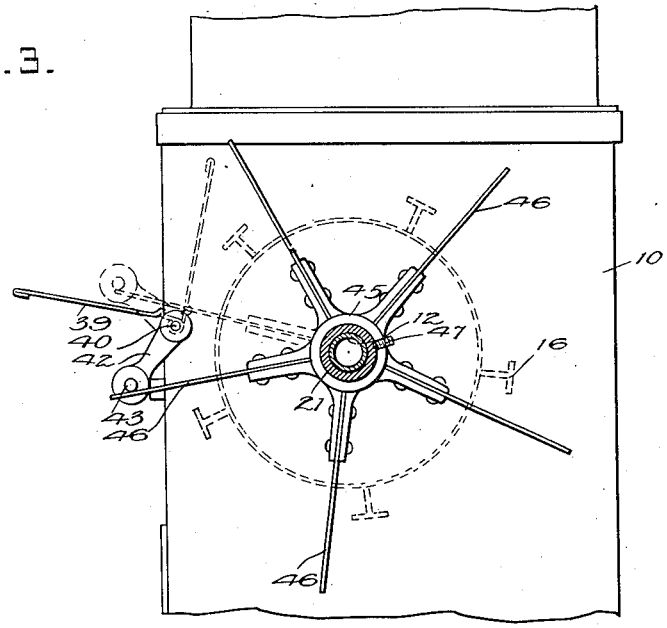
Figure 3 is an end elevation of the hub mounted on a hollow shaft and provided with spring spokes for operating the feeding means.
Figure 4:
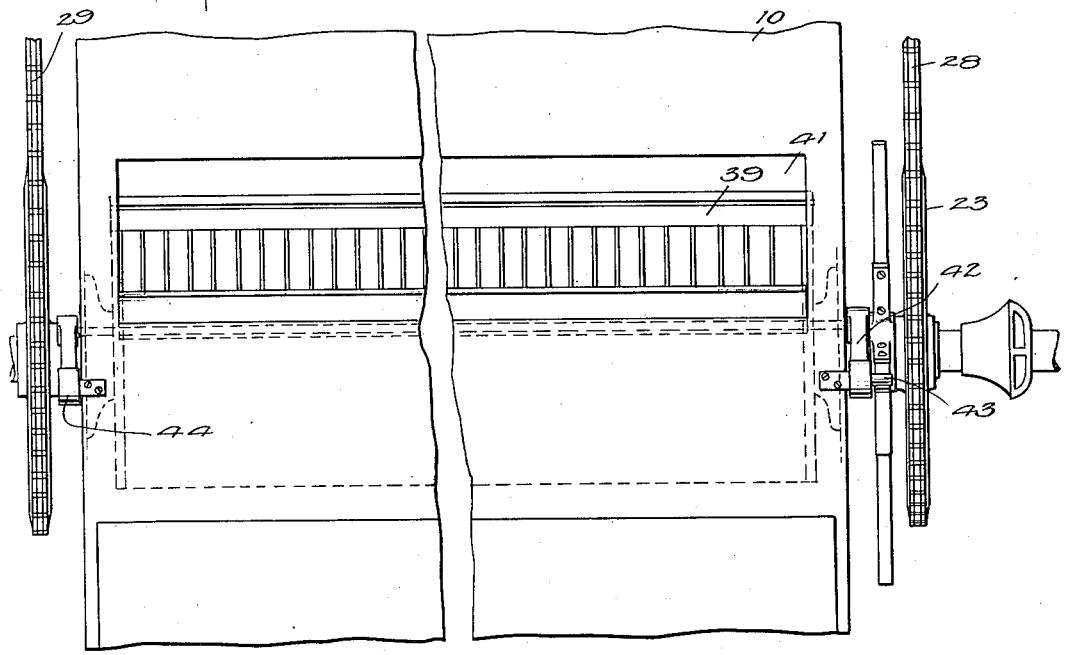
Figure 4 is a side elevation showing the feeding apparatus after it is operated to project the bread onto the drum.

A hub 45 is attached to the sleeve 21 by means of a set screw 47. Extending radially outward from this hub and supported thereby are spring spokes 46. These spokes are of a sufficient length to engage the projection 43 of the weighted arm 42 when it is in its lower position. As the drum 13 rotates, the hub 45 is rotated clockwise, as viewed in Figure 3. The projection 43 is engaged by one of the spring spokes 46 and carried up to the dotted position shown in the figure. When the weighted arm reaches the position shown in the dotted lines the spring spoke bends and slides past the projection, allowing the arm 42 to drop back into its original position. As the weighted arm 42 is rotated about the axis of the trunnions 40 the rack 39 is also rotated about the same axis. The distance through which the rack 39 may be rotated about the trunnions 40 is limited by means for stop blocks 48 attached to the ends of the casing 10.

The operation of the device is as follows: The bread is first placed in position along the rack 39. The motor 32 is then set in operation, rotating the drum 13 and the hub 45. As the hub 45 rotates, one of the spring spokes 46 engages the projection 43, rotating the weighted arm 42 and the rack 39 about the trunnions 40 into the position shown in Figure 1. The pieces of bread 37 are then projected from the rack 39 onto the drum 13 where they are received by one of the T-shaped shelves 16. When the spring spoke 46 passes slightly beyond the position shown by dotted lines in Figure 3 it releases the projection 43 and the weighted arm drops back to its original position where the rack 39 is ready to receive more bread. The bread that has been deposited on the drum is carried forward and finally arrives in the position shown in Figure 1 where it is located between the burners 33 and 34. The burners, which are lighted as soon as the operator desires to use the toaster, direct flames in the direction of the bread which is to be toasted. When the drum moves another step forward the toasted bread is dropped into a drawer 49 located in the bottom of the casing 10.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims.

1. A bread toaster, comprising a casing, a drum provided with supporting means for receiving the bread rotatably mounted in the casing, means for revolving the drum, means for feeding the bread onto said bread receiving means, and means provided in conjunction with the drum for operating said feeding means.

2. A device of the class described for toasting bread, comprising a casing, a drum provided with bread supporting means rotatably mounted in the casing, means for revolving said drum, means for feeding the bread onto the bread supporting means carried by the drum, means attached to the drum to revolve therewith for operating said feeding means, and burners positioned inside and outside of the drum.

3. In a toaster, a rotatably mounted drum, means carried by the drum for receiving the articles to be toasted, means for feeding the articles to be toasted on to said receiving means, and means carried by the drum for operating the feeding means as the drum revolves.

4. In a device for toasting bread including a casing and a drum provided with bread receiving means, a feeding mechanism comprising a rack pivotally mounted on the casing parallel to said drum, a weighted arm attached to said rack and extending at an angle thereto, and spring arms attached to said drum for engaging said weighted arm to operate said rack.

5. In a toaster, a rotatably mounted drum, T-shaped support carried by the drum for receiving the articles to be toasted, means for feeding the articles to be toasted onto the T-shaped supports, and means carried by the drum for operating said feeding means.

6. In a device for toasting bread including a casing and a drum provided with bread receiving means rotatably mounted in the casing, means for feeding the bread to said bread receiving means, comprising a rack pivotally mounted in the casing and extending parallel to the drum, a weighted arm attached to said rack and extending at an angle thereto, and a hub having a plurality of spring spokes extending radially outward attached to the drum, said spring spokes serving to engage the weighted arm to rotate the same through a certain angle to operate the rack as the drum revolves.

7. In a toaster, a rotatably mounted drum, supports adapted for carrying on either side the material to be toasted mounted on the drum, means for feeding the material to be toasted onto said supports, and means for operating the feeding means carried by the drum.

8. In a toaster including a toasting drum provided with means for holding the material to be toasted, means for feeding the material to be toasted, said holding means comprising a pivotally mounted rack extending parallel to the drum, means for normally retaining the rack in a position for receiving the material to be toasted, and means carried by the drum for operating said rack casing to feed the material to be toasted to the holding means.

9. A device for toasting bread, comprising a casing, a drum provided with a plurality of bread supporting members rotatably mounted on a hollow shaft carried by the casing, means for revolving said drum, means for feeding bread onto the bread supporting members carried by the drum, a burner carried by said hollow shaft and supplied with fuel through the same located inside of said drum for directing a flame outward through the drum, a second burner mounted in the frame outside of the drum and in alinement with said first burner for directing a flame toward the drum, and means interposed between the drum and said second burner for preventing the bread from dropping into the flame.

10. In a device for toasting bread including a casing and a drum rotatably mounted on the hollow shaft carried by the casing, toasting means comprising a burner positioned in the drum, fixed to the hollow shaft and supplied with fuel through said shaft, and a second burner mounted in the casing, positioned outside of the drum in alinement with said first-mentioned burner.

11. A device for toasting bread, comprising a casing, a drum provided with bread supporting means rotatably mounted on a hollow shaft carried by the casing, means for revolving said drum carried by the casing, means for feeding the bread onto said bread supporting means, means attached to the drum for operating said bread feeding means, a burner carried by said hollow shaft and supplied with fuel from the same for directing a flame outward through the drum, a second burner mounted in the casing in alinement with the burner located in the drum for directing a flame inward, a screen positioned in the front of said burner for protecting the bread, and means for receiving the toast positioned in the casing below the drum.

ELIE J. MONEUSE.